Nov. 1, 1955  M. C. BRANCH ET AL  2,722,630
ELECTRICAL COUNTING CIRCUITS
Filed Aug. 3, 1953
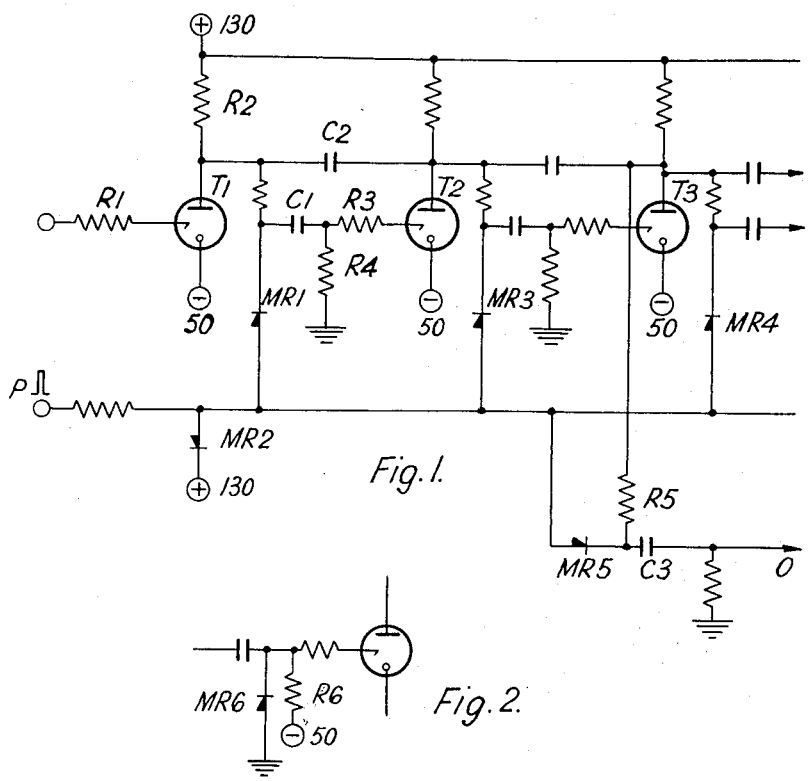
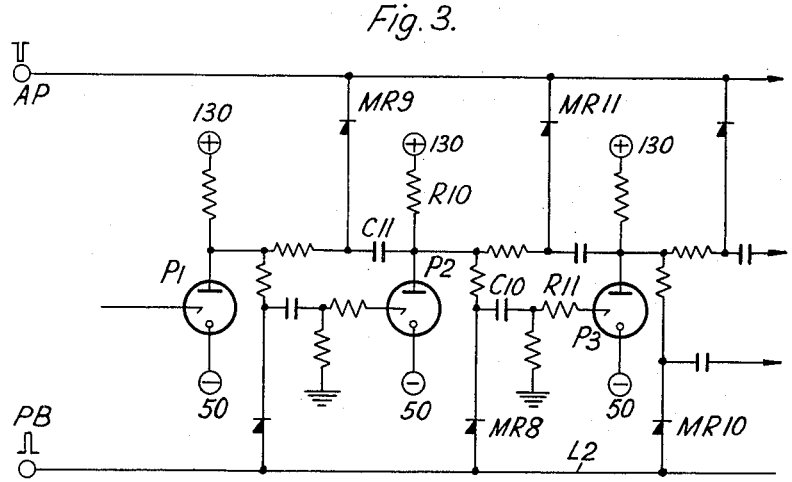
Inventor
M. C. BRANCH - P. M. KING -
W. A. G. WALSCH
By *R. P. Morris*
Attorney United States Patent Office 2,722,630
Patented Nov. 1, 1955

2,722,630

ELECTRICAL COUNTING CIRCUITS

Maurice Charles Branch, Peter Morris King, and William Arthur George Walsh, London, England, assignors to International Standard Electric Corporation, New York, N. Y.

Application August 3, 1953, Serial No. 371,932

Claims priority, application Great Britain August 11, 1952

10 Claims. (Cl. 315—166)

The present invention relates to electrical counting chain circuits of the type using interconnected gaseous discharge tubes. The present application is an improvement of the circuit shown in my application, Serial No. 249,898, filed October 5, 1951.

According to the present invention there is provided a gaseous discharge tube counting circuit of the type which is responsive to pulses received over a common supply lead, which circuit comprises a coincidence gate circuit between the tubes of each pair of consecutive tubes in the circuit, each said gate circuit interconnecting the anode of the first tube of a pair, the trigger electrode of the second tube of the pair, and the common supply lead in such a way that the second tube of a pair has a pulse applied to it and fires when coincidence occurs between discharge at the first tube of the pair and a pulse on said common supply lead.

The invention will now be described with reference to the accompanying drawings, in which:

Fig. 1 is a counting chain according to the present invention;

Fig. 2 is a modification of the circuit of Fig. 1; while

Fig. 3 is a pattern movement register according to the present invention.

Referring first to Fig. 1, there will be seen the first three tubes T1, T2, T3 of a counting chain. In the normal of zero condition of the counter, tube T1 is fired by a positive potential applied to its trigger electrode via resistance R1. The means for doing this is not shown. With T1 conducting, the upper or positive end of rectifier MR1 is connected to a potential of approximately +30 volts due to the voltage drop in the anode load resistance R2 of T1.

The pulses which are to be counted are of 120 volts amplitude, ranging from +10 volts to +130 volts, and are applied to terminal P. Neglecting MR2 for the moment, this pulse causes MR1 to conduct, since its upper or positive end is held at +30 volts, which voltage is a relatively-negative voltage for the gate including MR1. Hence a pulse of about +100 volts passes via MR1, C1 and R3 to the trigger electrode of T2. This pulse raises the trigger-cathode voltage of T2 to 150 volts, so T2 fires. When T2 fires, its anode potential goes suddenly negative, and this negative-going pulse is applied to the anode of T1 via condenser C2. Therefore T1 is extinguished.

Returning to the commencement of the pulse, when T1 was the only discharging tube it will be seen that the anodes of T2 and T3 were then both at +130 volts, since these tubes were then quiescent. Hence rectifiers MR3 and MR4 have their upper ends at +130 volts and therefore cannot pass a P pulse to their respective tubes T3 and T4 (not shown) respectively.

Thus an incoming pulse on terminal P finds only one open gate, that between the discharging tube and the next tube in the chain, so only that tube whose input circuit is controlled by that gate can fire. When a tube is fired it extinguishes the preceding tube.

Returning to Fig. 1, it will be seen that the trigger electrode of T2 is earthed via R3 and R4 in series, which gives it a 50 volt bias with respect to the cathode. This is the steady bias provided to maintain the tube ready for operation in response to an incoming pulse.

Such a circuit can be used as described as a counting circuit, or as a distributor. In the latter case a gate circuit is provided for each output from the distributor which is used. One such gate circuit has been shown in Fig. 1. It comprises a connection via a rectifier MR5 to the pulse supply line and a connection via a resistance R5 to the anode of its controlling tube. In the example shown, if T3 is discharging, the next pulse fires T4, as already described. Since the right hand end of MR5 is at +30 volts as T3 is discharging, this pulse is also applied to the output point O via C3.

The rectifier MR2, which is connected between +130 volts and the common pulse supply line, serves to limit pulse amplitude to the HT supply voltage. This prevents spurious pulses being passed via the gate rectifiers, such as MR1, etc., should the pulse amplitude be too excessive.

The rectifiers, shown in Fig. 1, can be replaced by cold cathode diodes, in which case capacitive effects of rectifiers, which might have limiting effects on the speed of operation of the circuit, are avoided. In any case, the leading edge of the pulse is sloped, so that the full voltage is reached after 20 microseconds. This avoids breakthrough via the self-capacitance of the rectifiers which could occur if a too steep-fronted pulse is used. Such breakthrough could cause spurious firing of one or more tubes. The use of cold cathode diodes, as described, has the disadvantage that in order to get an adequate size of driving pulse it is necessary to "catch" the driving voltage at about 50 volts above the supply voltage, this necessitating an extra potential source. This increased pulse voltage is needed as the voltage drop in a cold cathode diode is greater than that in a metal rectifier in its forward direction.

In the circuit shown in Fig. 1, it is desirable to switch the positive supply voltage on in a series of steps, or to increase the voltage slowly to the full value. If this is not done, there is a risk that several tubes, maybe all of the tubes, will immediately fire, which is clearly undesirable. This is because there is a direct pulse supply circuit via the resistance shown to the trigger electrodes. To overcome this possible disadvantage, the modification shown in Fig. 2 is used.

In this arrangement, the bias connection for the trigger electrodes is replaced by a resistance R6 connected to a relatively negative potential, —50 volts in the present case, and a rectifier MR6 connected at its negative end to earth. Normally current flows from earth via MR6 and R6 to —50 volts, and the resistances of R6 and the forward resistance of MR6 are such that the normal potential of their junction is at or near earth potential.

When the supply is switched on, the sole effect of the "kick," so produced, which might otherwise fire a tube, is to bias the rectifiers MR6 to their high resistance states, thus stopping current flow therethrough. This acts to prevent the spurious firing mentioned. A further advantage of this is that the self-capacitance of MR6 eliminates spurious firing as a result of pulses passing via the self-capacitance of the gate rectifiers. Hence the sloping of the pulses referred to is no longer needed.

The embodiment of the invention shown in Fig. 3 is a pattern movement register or shift register. Three tubes P1, P2 and P3 are shown, and consecutive pairs of these tubes are interconnected by gate circuits arranged, as in Fig. 1, and by further gate circuits controlled by negative pulses applied at terminal AP to a common supply lead L1. The positive pulses, are applied at terminal PB to a common supply lead L2. The two pulse supplies operate in synchronism.

In a pattern movement register, a pattern of stored information represented by any number (including one) and any spacing of discharging tubes is stored and pulses are applied in common to all tubes of the circuit. The effect of each pulse, or each positive and negative pulse in synchronism in the present circuit, is to progress the pattern of stored information one tube along the circuit.

Information can be inserted in such a storage circuit either in series or in parallel. When information is inserted in series it is done by firing the first tube of the circuit between two consecutive step pulses, or step pulse pairs in the present case. If the stored information is such that part of it is represented by a quiescent tube, then the first tube is not fired between the pulses of the appropriate pair of step pulse pairs. Thus when the information is inserted in series, it is inserted at one point, i. e. at one tube, by firing or not firing the tube at that point, as is required by the inserted information.

When information is inserted in parallel, the complete information to be inserted is all inserted at the same time by firing one or more tubes over independent firing circuits. This operation occurs between two step pulses.

For series insertion, only one insertion point is needed, and for parallel insertion a number of insertion points are needed. Each insertion point controls a firing circuit for one tube. Since these firing circuits are well known they are not shown in Fig. 3. Hence it will be seen that at least one tube of the circuit will have two firing circuits, that shown in Fig. 3 and an insertion point firing circuit. These circuits should preferably be rectifier decoupled.

As an example of a pattern movement register which can have series insertion and/or parallel insertion, we would mention that shown in U. S. Patent No. 2,649,502, issued August 18, 1953.

It will be assumed first that in Fig. 3 the pattern of stored information is such that only tube P2 is discharging. Therefore the anode potential of P2 is at about +30 volts, owing to current flow in resistance R10, and so the upper or positive end of rectifier MR8 has a bias of about +30 volts. Further, since P1 is quiescent, its anode voltage is at the full HT voltage of +130 volts, so the lower or negative end of rectifier MR9 is at or near to +130 volts.

The effect of a step pulse, which occurs as a positive pulse on L2 and a negative pulse on L1, will now be examined. The positive pulse will be considered first. In the example under discussion, this finds that only MR8 has such a bias applied to it that it can pass current. Therefore the positive going pulse is applied via MR8 and condenser C10 and resistance R11 to the trigger electrode of tube P3, which tube thereupon fires. This is the sole effective result of the positive pulse. The negative pulse will now be considered. In the example under discussion, this finds rectifier MR9 with its negative end positively biassed, so MR9 passes a negative going pulse which via condenser C11 extinguishes P2. All other rectifiers connected to L1 whose negative ends are connected via resistances to the anode of a quiescent tube will also pass pulses, but unless these tubes are succeeded by a tube which was discharging when the pulse matured they will be ineffective.

The action of the circuit when there are a number of consecutive tubes discharging in the pattern of stored information will now be examined. For this purpose it will be assumed that P2 and P3 are discharging. As before, the effect of the positive pulse will be considered first. The positive pulse finds rectifiers MR8 and MR10 with their positive ends biassed by the relatively negative potential of +30 volts. Therefore both of these gates pass positive pulses, which pulses are applied to the trigger electrodes of P3 and P4 (not shown). As P3 is already discharging, the effect of the positive pulse is to fire P4.

The negative pulse will now be considered. As before, since P1 is quiescent, the relatively positive potential on the negative end of MR9 allows a negative pulse to pass via MR9 and C11 to the anode of P2, which is therefore extinguished. However, since P2 is discharging, its anode potential is relatively negative, so the bias on the negative end of MR11 is of such a value that no pulse or only a very small pulse, can pass via MR11. Therefore P3 is not extinguished. Similarly no pulse can be passed to P4 since P3 is initially discharging.

The action in response to a single step pulse combination comprising a positive pulse on one supply lead and a negative pulse on the other supply lead will now be briefly summarised. Each tube which is discharging has its anode potential at a relatively negative potential, and this opens a gate for a positive pulse to pass from one supply lead to the immediately succeeding tube when the step pulses occur. The immediately succeeding tube is therefore fired if not already discharging. Each tube which is quiescent has its anode at a relatively positive potential, which opens a gate for a negative pulse to pass from the other supply lead to the immediately succeeding tube when the step pulses occur. The immediately succeeding tube is therefore extinguished, if not already extinguished. As has already been stated, these actions result in the pattern of stored information represented by any number (including one) and any spacing of discharging tubes being progressed along the circuit by one stage in response to one step pulse combination.

The modification described with reference to Fig. 2 can be applied in the circuit of Fig. 3. It may also be desirable to use a connection from L2 to +130 volts via a rectifier arranged like MR2 in Fig. 1 with a resistance between L2 and PB to prevent the potential on PB from exceeding +130 volts.

In the case if either Fig. 1 or Fig. 3, by connecting the last and first tubes together as in the same manner as other pairs of tubes are connected together, a continuously circulatable circuit is obtained.

While the principles of the invention have been described above in connection with specific embodiments, and particular modifications thereof, it is to be clearly understood that this description is made only by way of example and not as a limitation on the scope of the invention.

What we claim is:

1. A gaseous discharge tube counting circuit of the type which is responsive to pulses received over a common supply lead and having a plurality of tubes each having an anode, a cathode, and a trigger electrode, which circuit comprises a coincidence gate circuit between the tubes of each pair of consecutive tubes in the circuit, each said gate circuit interconnecting the anode of the first tube of a pair, the trigger electrode of the second tube of the pair and the common supply lead, and including means for applying a pulse to the second tube of a pair sufficient to fire said tube when coincidence occurs between dicharge at the first tube of the pair and a pulse on said common supply lead.

2. A gaseous discharge tube counting circuit, as claimed in claim 1, which further comprises a second common supply lead over which pulses may be applied to all of said tubes, the pulses on said two common supply leads occurring in synchronism, and a second coincidence gate circuit between the tubes of each pair of consecutive tubes, each said second gate circuit interconnecting the first and second tubes of said pair and said second common supply lead and including means for applying a pulse to the second tube of a pair to extinguish said tube (if not already quiescent) when coincidence occurs between the first tube of the pair being quiescent and a pulse on said second supply lead, whereby each pair of pulses, one on each said supply leads causes a pattern of information, stored in said circuit as a pattern comprising any number, including one, of said tubes discharging and any possible spacing of said discharging tubes, to be shifted one stage along said circuit.

3. A circuit as claimed in claim 2, in which the circuit is adapted to operate when positive pulses are received on said first common supply lead and negative pulses are received on said second supply lead, and in which said second gate circuit associated with a pair if tubes is connected between the anodes of said pair of tubes.

4. A circuit, as claimed in claim 3, wherein the said first coincidence gate circuit comprises an anode resistor connected to the anode of each tube, a rectifier connected between said first common supply lead and the anode resistor of the first tube of the pair, said rectifier being so poled as to be in the direction of easy conductivity for current flowing from the common supply lead toward said anode, and a connection from the end of said rectifier remote from said common supply lead to the trigger electrode of the second tube of said pair, said gate circuit being such that said rectifier only allows a pulse of sufficient magnitude to fire said second tube to reach the trigger electrode thereof when the first tube of the pair is discharging when a pulse occurs on said common supply lead.

5. A circuit, as claimed in claim 4, and wherein said second coincidence gate circuit comprises a resistance connected at one end to the anode of the first tube of a pair, a rectifier connected between the second common supply lead and the end of said resistance remote from the anode of said first tube, said rectifier being so poled as to be in the direction of easy conductivity for current flowing from said anode of said first tube through said resistance and said rectifier in series to said second common supply lead, and a connection from the junction point of the resistance and the rectifier to the anode of the second tube of the pair, said second gate circuit being such that said rectifier only allows a pulse of sufficient magnitude to extinguish said second tube to reach the anode thereof when the first tube of the pair is quiescent when a pulse occurs on said common supply lead.

6. An electrical distributor comprising an electrical counting circuit, as claimed in claim 1, and which comprises an output gate circuit associated with every tube of said circuit from which an output is required.

7. A distributor, as claimed in claim 6, and in which each said output gate circuit comprises a connection via a rectifier to said common supply lead, said rectifier being so poled as to be in the direction of easy conductivity for current flowing from said common supply lead to the output point, and a connection to the anode of the tube from which an output is required, said gate circuit being so arranged as to only deliver an output when its controlling tube is discharging.

8. A gaseous discharge tube counting circuit of the type which is responsive to pulses received over a common supply lead and having a plurality of tubes each having an anode, a cathode, and a trigger electrode, which circuit comprises a coincidence gate circuit between the tubes of each pair of consecutive tubes in the circuit, each said gate circuit interconnecting an anode of the first tube of a pair, the trigger electrode of the second tube of the pair, and the common supply lead, and including means for applying a pulse to the second tube of a pair sufficient to fire said tube when coincidence occurs between discharge at the first tube of the pair and a pulse on said common supply lead, said coincidence gate circuit comprising an anode resistor connected to the anode of each tube, a rectifier connected between said common supply lead and the anode resistor of the first tube of the pair, said rectifier being so poled as to be in the direction of easy conductivity for current flowing from the said common supply lead towards said anode, and a connection from the end of said rectifier remote from said common supply lead to the trigger electrode of the second tube of said pair, said gate circuit being such that said rectifier only allows a pulse of sufficient magnitude to fire such said second tube to reach the trigger electrode thereof when the first tube of the pair is discharging when a pulse occurs on a said common supply lead.

9. An electrical distributor comprising an electrical counting circuit, as claimed in claim 8, further comprising an output gate circuit connected to either tube of such circuit from which an output is required.

10. A circuit, as claimed in claim 2, and wherein a second coincidence gate circuit comprises a resistance connected at one end to the anode of the first tube of a pair, a rectifier connected between the second common supply lead and the end of said resistance remote from the anode of said first tube, such rectifier being so poled as to be in the direction of easy conductivity for current flowing from said anode of said first tube, through said resistance and said rectifier in series to said second common supply lead, and a connection from the junction point of said resistance and said rectifier to the anode of the second tube of the pair, said second gate circuit being such that said rectifier only allows a pulse of sufficient magnitude to extinguish said second tube to reach the anode thereof when the first tube of the pair is quiescent when a pulse occurs on said second supply lead.

References Cited in the file of this patent

UNITED STATES PATENTS

| 2,598,764 | Desch et al. | June 3, 1952 |
| 2,646,534 | Manley | July 21, 1953 |
| 2,649,502 | Odell | Aug. 18, 1953 |

FOREIGN PATENTS

| 677,872 | Great Britain | Aug. 20, 1952 |